Patented July 27, 1954

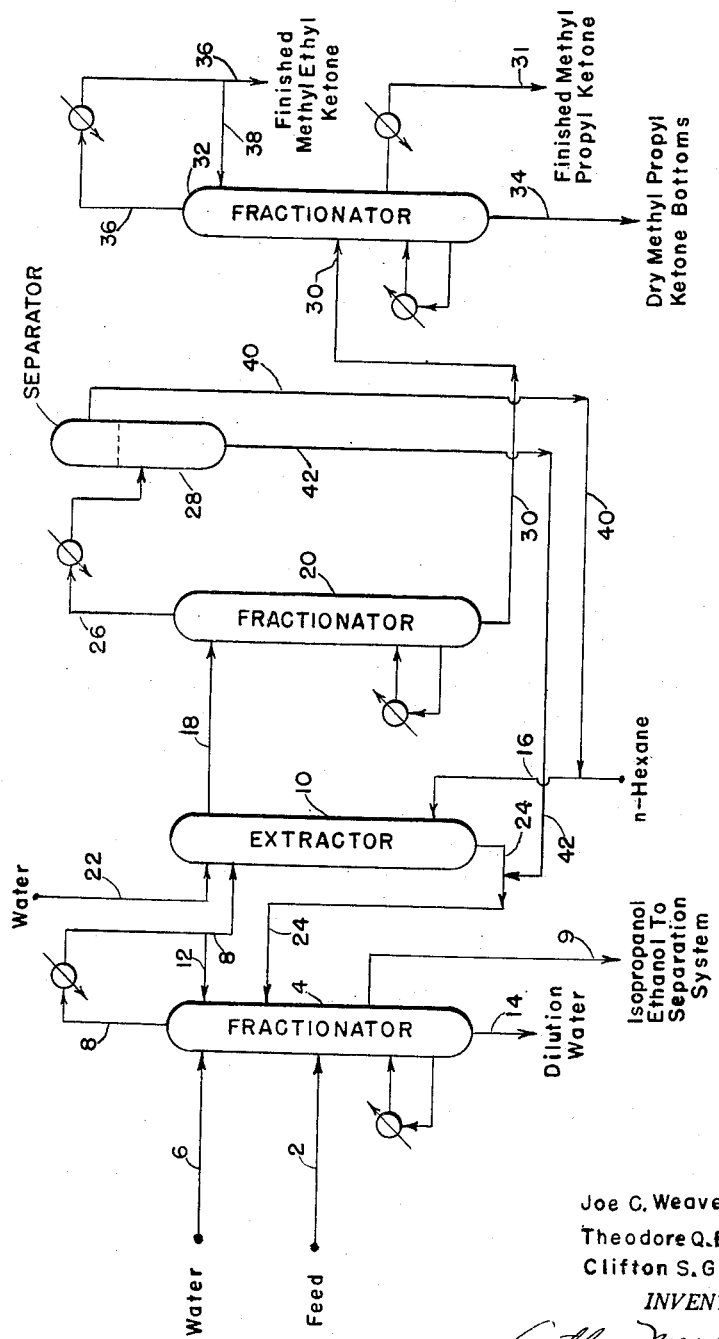

2,684,934

UNITED STATES PATENT OFFICE 2,684,934

PROCESS FOR DRYING METHYL ETHYL KETONE

Joe C. Weaver, Jr., Theodore Q. Eliot, and Clifton S. Goddin, Jr., Tulsa, Okla., assignors to Stanolind Oil and Gas Company, Tulsa, Okla., a corporation of Delaware Application August 20, 1949, Serial No. 111,542

6 Claims. (Cl. 202—39.5)

The present invention relates to an improved process for the procurement of substantially dry methyl ethyl ketone. More particularly, it pertains to a method for securing methyl ethyl ketone in a substantially anhydrous condition from aqueous mixtures thereof; particularly, mixtures of the type encountered in the separation of water-soluble chemicals produced when carbon monoxide is reduced with hydrogen in the presence of a promoted iron catalyst at temperatures of from about 450° to about 700° F. and at pressures ranging from about 150 to about 450 p. s. i. g.

Methods previously employed for drying methyl ethyl ketone involved first distilling the crude material in the presence of water to obtain an azeotrope consisting of about 89 per cent methyl ethyl ketone and about 11 per cent water. Further separation of water from methyl ethyl ketone was then effected by salting out the latter. The resulting oil layer was withdrawn, distilled, and the remaining water removed as an azeotrope with methyl ethyl ketone. The bottoms portion which represented the bulk of the methyl ethyl ketone was obtained in the form of a substantially anhydrous residue. Methyl ethyl ketone, dried in accordance with the procedure just given, has a number of obvious disadvantages including the corrosion problems involved in procedures employing solutions of calcium chloride, sodium chloride, or similar brines and the disadvantages of intermittent operation as well as the handling of solid solutions.

Other procedures for the recovery of methyl ethyl ketone in substantially anhydrous form from aqueous mixtures thereof have been concerned with the removal of that compound in the form of a ternary azeotrope with water and an aliphatic hydrocarbon. The resulting distillate containing water, aliphatic hydrocarbon, and methyl ethyl ketone in azeotropic proportions was then countercurrently extracted with water to effect a substantial separation of the methyl ethyl ketone from the aliphatic hydrocarbon. The dilute aqueous solution of methyl ethyl ketone thus obtained was next subjected to fractional distillation to give a distillate consisting of the methyl ethyl ketone-water binary azeotrope. Further water removal from this azeotrope was effected by extracting the latter with a concentrated solution of sodium hydroxide, after which the raffinate layer was distilled whereby the remaining water was removed in the form of a methyl ethyl ketone-water binary leaving a still residue consisting essentially of dry methyl ethyl ketone. While substantially anhydrous methyl ethyl ketone may be obtained in accordance with the procedure just outlined, to effect this end the relatively large volumes of water present require appreciable heat input as well as considerable distillation capacity. Thus, in order to remove water from methyl ethyl ketone in accordance with the above procedure, four separate distillation steps are necessary, i. e., (1) distillation of the crude aqueous mixture with an aliphatic hydrocarbon to remove the methyl ethyl ketone in the form of a constant boiling mixture with water and hydrocarbon, (2) distillation of the water extract obtained by contacting with water the distillate formed in step 1, (3) distillation of the raffinate resulting from the extraction of the distillate produced in step 2 with a sodium hydroxide solution, (4) distillation of the residue obtained in step 3 to effect separation of methyl ethyl ketone from the caustic.

Accordingly, it is an object of our invention to provide a simple and efficient method for removing water from methyl ethyl ketone in one distillation step to obtain a water-white product. It is a further object to provide a process whereby substantially anhydrous methyl ethyl ketone may be recovered from aqueous mixtures thereof such as, for example, from the water stream produced in the synthesis of hydrocarbons by the catalytic reduction of carbon monoxide with hydrogen.

In accordance with the process of our invention, a mixture comprising methyl ethyl ketone and water is charged to a liquid-liquid extractor where it is extracted with a suitable aliphatic hydrocarbon such as, for example, n-hexane. In this extraction step, approximately all of the methyl ethyl ketone is taken up by the hexane, while only about 30 per cent of the original water passes into the hexane layer. The water layer thus obtained may be rejected; or, preferably, it may be utilized in conjunction with the operation of the initial distillation column in a manner explained more fully below. The hexane layer containing the bulk of the methyl ethyl ketone together with a relatively small percentage of water is next subjected to azeotropic distillation under atmospheric pressure yielding a distillate which consists either of a ternary azeotrope containing 3.7 per cent water, 24.1 per cent methyl ethyl ketone, and 72.2 per cent n-hexane, and boiling at 59° C., or mixtures of that azeotrope with methyl ethyl ketone-water or methyl ethyl ketone-hexane azeotropes. The distillate preferably should consist of methyl ethyl ketone-hexane-water ternary plus methyl ethyl ketone-water binary azeotrope, together with a small excess of methyl ethyl ketone. The boiling point of this distillate may range from about 59° to 72° C. In this connection, the drying efficiency of this distillation operation can be materially increased by the utilization of superatmospheric pressures up to about 50 to 60 p. s. i. g. Thus, by increasing the pressure within the range indicated, an increase in water content of the azeotrope is effected which results in a significant increase in drying efficiency.

The extractant employed should be one capable of forming with methyl ethyl ketone and water a ternary which boils sufficiently low that such ternary can be distilled from any given mixture of methyl ethyl ketone, water, and the extractant. Moreover, the ternary thus obtained should contain an appreciable amount of water so that relatively efficient drying of the methyl ethyl ketone can be effected. The extractant when dry should boil considerably below methyl ethyl ketone, i. e., preferably at least 8 to 10 degrees C., so that effective stripping of the extractant from methyl ethyl ketone may be continuously obtained. Also, the extractant employed should possess a high selectivity for methyl ethyl ketone in aqueous mixtures of widely varying concentrations. n-Hexane possesses all of the above-mentioned requirements and hence constitutes a preferred extractant. Also, other aliphatic hydrocarbons such as, for example, the methyl pentanes, the hexenes, or the methyl pentenes may likewise be employed as suitable extractants in carrying out our invention. Other hydrocarbons such as benezene may also be employed as extractants in our system; however, in using benzene the circulation rate thereof through the system should be such that a deficiency of benzene in the drying column always prevails, i. e., the ternary azeotrope distilled should contain all of the benzene. If such precautions are not observed, benzene will appear in the drying column bottoms along with methyl ethyl ketone since the boiling points of these two compounds are less than 1° C. apart; and, accordingly, removal of the benzene cannot be effected by conventional fractional distillation.

The quantity of hydrocarbon employed in effecting the extraction step may vary within a relatively wide range. However, in the majority of instances, we have found it preferable to utilize quantities of from about 30 to about 150 per cent based upon the weight of ketone present in the aqueous mixture charged to the extractor.

The process of our invention may be further illustrated by reference to the accompanying drawing in which an aqueous fraction derived from the water stream obtained in the synthesis of hydrocarbons by the catalytic reduction of carbon monoxide with hydrogen, said aqueous fraction containing 2.4 weight per cent methyl ethyl ketone, 0.4 weight per cent methyl propyl ketone, and 0.9 weight per cent alcohols as isopropanol and ethanol, is introduced through line 2 into column 4 where extractive distillation with water to remove the alcohols is effected by the introduction of water through line 6 in accordance with the procedure described in our copending application U. S. Ser. No. 87,698, filed April 15, 1949. The distillate thus obtained, containing 76.8 weight per cent methyl ethyl ketone, 10.5 weight per cent methyl propyl ketone, 0.3 weight per cent hexane, and 12.4 weight per cent azeotropic water, is taken overhead through line 8 and sent to liquid-liquid extractor 10, while a small portion of the stream is returned as reflux through line 12. If desired, methyl propyl ketone can be separated from methyl ethyl ketone at this point by means of straight fractional distillation since the binary of methyl ethyl ketone and water boils approximately 10 degrees C. lower than the methyl propyl ketone-water binary. A small amount of hexane appears in the distillate as the ternary azeotrope. The two streams, however, must then be dried separately. Our preferred procedure constitutes the extraction and drying of the mixture of these materials as described below, since the dry materials are easily separable from one another by ordinary fractional distillation. A side stream of isopropanol, ethanol, and water is withdrawn from column 4 through line 9 and sent to a portion of the system, not shown, where ethanol is separated from isopropanol by extractive distillation with water. The bottoms from column 4, consisting essentially of water, is withdrawn through line 14 and at least a portion thereof, if desired, used as dilution water in previous extractive distillation steps in the system for separating the various other components of the water stream. The distillate in extractor 10 is countercurrently extracted with a hexane-rich stream introduced through line 16 and the resulting hexane layer, rich in methyl ethyl ketone and methyl propyl ketone, is withdrawn through line 18 and sent to column 20. If the distillate introduced into extractor 10 contains any water soluble impurities, water may be introduced into the extractor through line 22 whereby water soluble compounds such as alcohols, etc., are extracted, withdrawn through line 24, and recycled back to column 4 for stripping to reject the water and soluble impurities through lines 14 and 9, respectively. Ketones plus traces of hexane are recovered in column 4 and returned to extractor 10 via line 8. The extract charged to column 20, consisting of 27.6 weight per cent n-hexane, 65.0 weight per cent methyl ethyl ketone, 4.8 weight per cent methyl propyl ketone, and 2.6 weight per cent water, is subjected to distillation to produce a distillate, boiling at about 65° C., which contains about 50.3 weight per cent methyl ethyl ketone, 45.5 weight per cent hexane, and 4.2 weight per cent water. This distillate is removed through line 26 and transferred to separator 28 where it is permitted to stratify into two layers. The hexane layer in separator 28 is returned to line 16 via line 40 where it is combined with the fresh hexane, as needed, in subsequent extractions. The water layer in separator 28 is returned to column 4 through lines 42 and 24. The bottoms fraction obtained in column 20 consists of dry methyl ethyl ketone and methyl propyl ketone which are withdrawn through line 30 and charged to column 32 where the two ketones in anhydrous form are separated by fractional distillation. The bottoms portion consisting of methyl propyl ketone is withdrawn through line 34. Alternatively, the methyl propyl ketone may be obtained as a vapor side stream 31 from above the base of column 32 and may be condensed to yield a pure dry product. The overhead fraction from column 32 consisting of finished methyl ethyl ketone is withdrawn through line 36. A portion of the methyl ethyl ketone in line 36 is returned to fractionating column 32 through line 38 as reflux. The foregoing procedure may, if desired, be modified by first introducing the feed in extractor 10 and thereafter transferring the water layer through line 24 to column 4. The oil layer may be transferred through line 18 to column 20 where fractionation may be effected as previously described. The chief advantage of either of the aforesaid procedures which involve pre-extraction of the aqueous methyl ethyl ketone with a hydrocarbon resides in the fact that it is necessary to vaporize only about 25 to 30 per cent of the azeotropic water in the original feed, whereas with other methods not embodying pre-extraction of such aqueous solutions with a hydrocarbon, all of the azeotropic water present in the feed must be vaporized. Such a drying operation in procedures of the last-mentioned type requires a very large total heat input and hence the cost of removing the water from methyl ethyl ketone in this manner is, comparatively speaking, quite high.

In the above-mentioned drawing reference to certain equipment such as pumps, gages, and the like which obviously would be necessary to actually operate the process has been intentionally omitted. Only sufficient equipment has been diagrammatically shown to illustrate the process and it is intended that no undue limitation be read into our invention by reference to the drawing and description thereof.

While the application of our invention to the purification of methyl ethyl ketone occurring in mixtures typical of those found in the hydrocarbon synthesis water stream has been set forth in some detail, our process may be directed with equal success to both extremely dilute as well as concentrated solutions, i. e., aqueous solutions containing from about 0.5 to about 98 per cent methyl ethyl ketone, and preferably from about 1 per cent to about 89 per cent methyl ethyl ketone, the latter being the concentration present in the water azeotrope. Also, by practicing our invention, methyl ethyl ketone may be recovered in anhydrous form from solutions containing water soluble compounds other than those found in the aforesaid water stream. In general, it may be said that the present invention is based upon the discovery that methyl ethyl ketone can be recovered in dry form from relatively dilute aqueous solutions thereof by first extracting the ketone with a hydrocarbon having the properties mentioned above, separating the resulting extract, and distilling said extract to remove all of the hydrocarbon and water, together with a portion of methyl ethyl ketone as distillate, leaving a residue of methyl ethyl ketone.

We claim:

1. In a process for obtaining substantially anhydrous methyl ethyl ketone from an aqueous mixture thereof, together with water-soluble impurities, the steps which comprise subjecting said aqueous mixture to extractive distillation with water in a fractionating column to obtain a distillate consisting essentially of the methyl ethyl ketone-water binary azeotrope and water-soluble impurities, introducing said distillate into an extraction zone, introducing a C₆ hydrocarbon into said zone countercurrently to the flow of said distillate to obtain a hydrocarbon extract and an aqueous raffinate layer, introducing water at a level in said zone above the point of introduction of said distillate whereby said water-soluble impurities present in said hydrocarbon extract are substantially completely removed therefrom, subjecting the resulting washed hydrocarbon extract to distillation to obtain as bottoms substantially anhydrous methyl ethyl ketone, removing overhead a ternary azeotrope of water, methyl ethyl ketone and C₆ hydrocarbon, allowing the resulting overhead to separate into an organic layer and a water layer, combining said water layer with said raffinate layer and returning these combined streams to said fractionating column.

2. In a process for obtaining substantially anhydrous methyl ethyl ketone from an aqueous mixture thereof, the steps which comprise subjecting said aqueous mixture to extractive distillation with water in a fractionating column to obtain a distillate consisting essentially of the methyl ethyl ketone-water binary azeotrope, thereafter extracting said distillate in an extraction zone with a C₆ hydrocarbon to yield a hydrocarbon extract rich in methyl ethyl ketone and lean in water and an aqueous raffinate layer, subjecting said hydrocarbon extract to distillation to obtain as bottoms substantially anhydrous methyl ethyl ketone, removing overhead a ternary azeotrope of water, methyl ethyl ketone and C₆ hydrocarbon, allowing the resulting distillate to separate into an organic layer and a water layer, combining said water layer with said raffinate layer, and returning these combined streams to said fractionating column.

3. In a process for obtaining substantially anhydrous methyl ethyl ketone from an aqueous mixture containing methyl propyl ketone, ethanol and isopropanol, the steps which comprise subjecting said aqueous mixture to extractive distillation with water to yield a distillate containing methyl ethyl ketone, methyl propyl ketone, isopropanol and water, withdrawing a side stream of isopropanol, ethanol and water from the distillation tower employed in this operation, thereafter introducing said distillate into an extraction zone, introducing a C₆ hydrocarbon into said zone countercurrently to the flow of said distillate to obtain hydrocarbon extract and an aqueous raffinate layer, introducing water at a level in said zone above the point of introduction of said distillate whereby isopropanol present in said extract is substantially completely removed therefrom, removing the resulting water-washed extract rich in methyl ethyl ketone and methyl propyl ketone and lean in water and isopropanol, thereafter subjecting said extract to distillation to obtain as bottoms a substantially anhydrous mixture of methyl ethyl ketone and methyl propyl ketone, removing overhead a distillate containing methyl ethyl ketone, water and C₆ hydrocarbon, allowing the resulting distillate to separate into an organic layer and a water layer, combining said water layer with said raffinate layer, and returning these combined streams to said fractionating column.

4. The process of claim 3 in which the C₆ hydrocarbon employed is hexane.

5. The process of claim 1 in which the C₆ hydrocarbon employed is hexane.

6. The process of claim 2 in which the C₆ hydrocarbon employed is hexane.

References Cited in the file of this patent

UNITED STATES PATENTS

| Number | Name | Date |
|---|---|---|
| 1,702,495 | Clapp | Feb. 19, 1929 |
| 2,050,235 | Othmer | Aug. 4, 1936 |
| 2,487,124 | Gatham et al. | Nov. 8, 1949 |
| 2,551,593 | Gilliland et al. | May 8, 1951 |
| 2,582,214 | Twigg | Jan. 8, 1952 |

FOREIGN PATENTS

| Number | Country | Date |
|---|---|---|
| 442,051 | Great Britain | Jan. 31, 1936 |